United States Patent [19]

Loise

[11] Patent Number: 5,630,046
[45] Date of Patent: May 13, 1997

[54] FAULT-TOLERANT COMPUTER ARCHITECTURE

[75] Inventor: Dominique Loise, Velizy-Villacoublay, France

[73] Assignee: Sextant Avionique, Velizy Villacoublay, France

[21] Appl. No.: 588,599

[22] Filed: Jan. 18, 1996

[30] Foreign Application Priority Data

Jan. 27, 1995 [FR] France .................................. 95 01076

[51] Int. Cl.$^6$ .............................. G01R 31/28; G06F 11/00
[52] U.S. Cl. .................... 395/182.09; 371/36; 371/68.1
[58] Field of Search .................... 395/182.09; 371/36, 371/67.1, 68.1, 68.2

[56] References Cited

U.S. PATENT DOCUMENTS

| | | | |
|---|---|---|---|
| 4,356,546 | 10/1982 | Whiteside | 371/67.1 X |
| 4,616,312 | 10/1986 | Uebel | 395/182.09 |
| 4,622,667 | 11/1986 | Yount | 395/182.09 |
| 4,644,538 | 2/1987 | Cooper | 395/182.08 |
| 4,667,284 | 5/1987 | Asami | 364/187 |
| 4,873,685 | 10/1989 | Millis, Jr. | 371/36 |
| 5,029,071 | 7/1991 | Kinoshita | 395/182.09 |
| 5,193,175 | 3/1993 | Cutts, Jr. | 395/182.09 |
| 5,271,023 | 12/1993 | Norman | 371/68.1 X |
| 5,305,325 | 4/1994 | Roos | 371/36 X |
| 5,504,860 | 4/1996 | George | 395/182.09 |
| 5,515,282 | 5/1996 | Jackson | 364/434 |

FOREIGN PATENT DOCUMENTS

0227520A1  11/1986  Germany .

OTHER PUBLICATIONS

Victor Maggioli, The Safety Matrix—A method for Guidelining Industrial Microcomputers IEEE Transactions on Industry Applications, vol. 25 No. 3, pp. 514–522, May/Jun. 1989.

Frederickson et al, Comparison of Fault Tolerant Controllers Used in Safety Applications, ISA Transactions, vol. 30 No. 4, pp. 97–106, 1991.

Primary Examiner—Robert W. Beausoliel, Jr.
Assistant Examiner—Glenn Snyder
Attorney, Agent, or Firm—Browdy and Neimark

[57] ABSTRACT

In order to perform a predetermined function, to detect failures, and to further perform the function after detection of a failure, a computer comprises two redundant processing chains and a monitoring device monitoring operating of the two chains, each chain comprising an acquisition circuit, a transmission circuit, and a processor performing the function and monitoring operating of the acquisition and transmission circuits of the other chain, and of the monitoring device, and issuing operating statuses of the elements monitored, the computer further comprising a voting device receiving the operating statuses in order to determine which elements have actually broken down, and a selection device intended to only output from the computer the results provided by a chain operating properly.

11 Claims, 2 Drawing Sheets

FAULT-TOLERANT COMPUTER ARCHITECTURE

BACKGROUND OF THE INVENTION

1. Field of the Invention

This invention relates to a fault-tolerant computer architecture.

It applies notably, though not exclusively, to computers that must provide a high rate of detection of operating failures such as e.g. those taken on board aerodynes.

2. Description of the Prior Art

Furthermore, in the field of commercial aviation, there is a drive to increase the availability rate of aircraft, and therefore to limit maintenance interventions outside of pre-programmed inspections. This objective implies that failures occurring in the electronic equipment of aerodynes must not alter either the reliability or the availability of the functions they perform, in order for it to be possible to defer any repair work until the next maintenance inspection. This requires an architecture capable of detecting the resources actually broken down with a high rate of confidence, and capable of reconfiguring itself on a redundant resource. In addition, to facilitate maintenance, such an architecture must be capable of discriminating between a failure and a flaw in the design, in order to avoid any unnecessary reconfiguration and unjustified maintenance operation.

At present, to achieve such reliability and security objectives, use is made of computers with redundant architecture in which the processing chain is duplicated to constitute a module which also checks that it is operating properly by comparing the results obtained by the two chains. When a difference is detected, thereby indicating that a failure has occurred, the module reverts to an idle state. To be able to continue the processing performed by the chain and to enable maintenance to be deferred, a second module similar to the first one is used.

This solution therefore implies an architecture with four redundant chain, thereby entailing particularly high costs.

To achieve these objectives at a lesser cost, it has been proposed that use be made of an architecture with three redundant processing chains coupled to a voting device which compares the results obtained by these three chains. When a difference is detected, the chain that provided a result differing from the one provided by the two other chains is declared out of order and made idle, the processing being continued by the two other chains which issue a datum signaling the failure.

However, a processing chain can be broken down into three functions, i.e.

a data acquisition function which receives all analog or digital type data to be processed, which converts the analog signals into digital data, and which includes a function selecting the datum to be provided at output, an actual data processing function, generally performed by means of a processor, which acts on the acquisition function to select the datum to be provided to it, and a transmission function to transmit the results provided by the processing function.

These solutions thus lead to the use of three complete redundant chains and are therefore expensive.

OBJECT OF THE INVENTION

The main object of this invention is to remedy the preceding disadvantages, particularly to provide a computer designed to perform at least one given function, capable of detecting failures and of performing said function after detection of a failure.

SUMMARY OF THE INVENTION

According to the invention, this computer is characterized in that it comprises two redundant processing chains each performing said function, and a monitoring device comprising a processing processor monitoring the operating of the two processing chains, each processing chain comprising an acquisition circuit, a transmission circuit and a processing processor monitoring the operating of the other chain and of the monitoring device, each processing chain and the monitoring device supplying data respectively relating to the operating status of the processing chains and monitoring device monitored, the computer further comprising a voting device connected to the two chains and to the monitoring device so as to receive said data in order to determine whether one of the two chains or the monitoring device has broken down, and a selection device intended to only output from the computer the results provided by the two chains deemed to be operating properly.

The architecture of this computer enables the fault tolerance objective to be achieved simply through the use of two redundant chains.

If a failure is detected on one of the processing chains or on the monitoring device, the processing function can be continued by the other chain, as can the monitoring function.

Compared with a device with three redundant chains, this saves the use of an acquisition circuit and a circuit to transmit the results.

Moreover, the computer embodying the invention has only one output instead of two or three as in the case of architectures with three or four redundant chains, thereby simplifying the connection of the computer to the other equipment in the aerodyne.

According to a feature of the invention, the processing functions of each of the two redundant chains comprise a means for monitoring the operating of the acquisition and transmission circuits, the result of these monitorings being transmitted to the input of the voting device in order to determine whether or not said chain should be declared out of order.

This arrangement also enables monitoring of the proper working order of the acquisition and transmission circuits, and a refining of fault finding.

According to another feature of the invention, the data at output of the transmission circuit of each of the two chains are applied to the input of the acquisition circuit so as to check that the transmission and receiving circuits are working properly.

BRIEF DESCRIPTION OF THE DRAWINGS

Further features and advantages of the invention will be apparent from an embodiment of the invention described, by way of a non-limiting example, in reference to the corresponding accompanying drawings in which.

DESCRIPTION OF THE PREFERRED EMBODIMENTS

Figure 1:
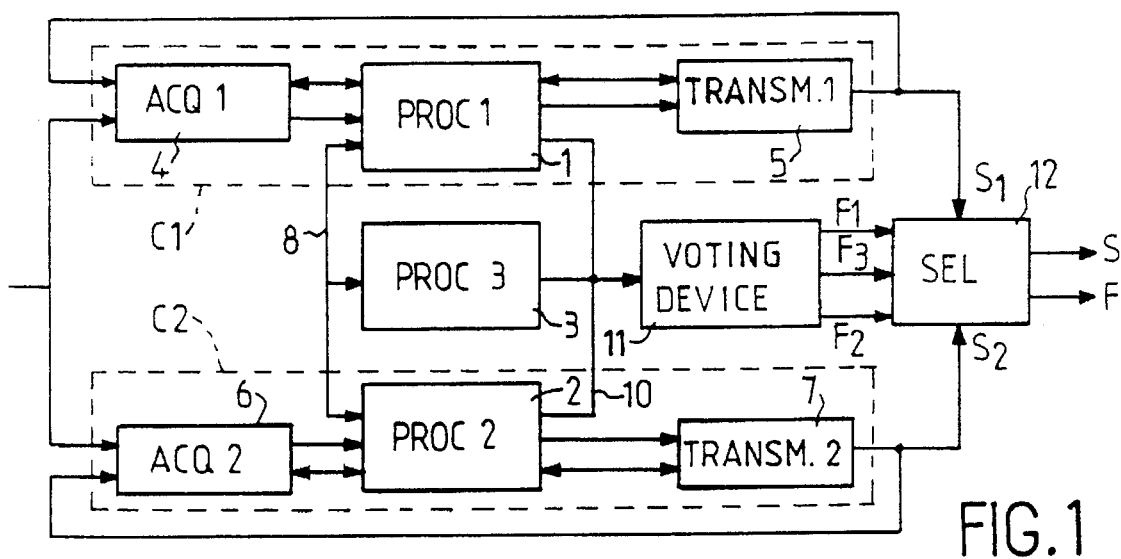
FIG. 1 schematically represents the architecture of the computer embodying the invention.

In FIG. 1, the computer embodying the invention comprises two redundant processing chains C1,C2, a monitoring device 3, a voting device 11 and a selecting circuit 12.

Each of these two processing chains C1,C2 comprises:

a processing processor 1,2 performing the actual processing of the data, an acquisition circuit 4,6 receiving the data at input of the processing chain, converting these data in accordance with a format susceptible of being processed by the processing processor 1,2, this circuit enabling the processor 1,2 to select the data to be processed at a given moment, and a transmission circuit 5,7 entrusted with transmitting the results obtained by the processor and with converting them in accordance with a format compatible with the equipment for which they are destined.

The monitoring device comprises a processor 3, the three processors of the computer being interconnected, e.g. by a two-way serial line 8, in order for each one to be capable of simultaneously triggering tests as background tasks on the two other processors, receiving the results of these tests, and comparing the results thus obtained with the expected values. Each processor 1,2,3 then transmits, onto the line 10, the result of these comparisons in the form of Boolean elements indicating the good or bad working order of the two other processors. These Boolean elements are received by the voting device 11 which performs a consolidation on the basis of their respective values in order to determine the effective operating status $F_1$, $F_2$, $F_3$ of the two processing chains C1,C2 and the monitoring device 3.

These statuses $F_1$, $F_2$, $F_3$ are then applied to the input of the selecting circuit 12 which supplies, at the output S of the computer and as a function of respective statuses $F_1$ and $F_2$ of the two processing chains C1,C2, either the results $S_1$ transmitted by the transmission circuit 5 of the first processing chain C1, or those $S_2$ transmitted by the transmission circuit 7 of the second processing chain C2.

This selecting circuit 12 advantageously comprises another output F issuing signals indicating the failures detected, for maintenance purposes.

In order to make the failure detection more complete, the output of the transmission circuit 5,7 of each chain is looped back to the input of the respective acquisition circuit 4,6. In this way, the processors 1,2 of each chain C1,C2 can determine whether the corresponding circuits are in good working order. They can also trigger off series of self-tests.

The result of these tests is transmitted in the form of a Boolean element $F_{1/1}$, $F_{2/2}$ by the processor 1,2, over the line 10, to the voting device 11.

According to an advantageous embodiment of the invention, these Boolean elements $F_{1/1}$, $F_{2/2}$ are transmitted by the selecting circuit 12 to the output F in order to facilitate fault finding at the time of repairing the computer, this indication making it possible to specify whether the fault is in the processor 1,2 or in the transmission 5,7 or acquisition 4,6 circuits.

Such a computer enables maintenance to be deferred as long as the function(s) performed by the computer is/are still available, i.e. as long as at least the two chains C1,C2 or one chain and the monitoring device 3 are operating properly. In this configuration, the computer is in a degraded mode of operation enabling it to detect failures. Should a test result error be detected in this mode by one of the processors still operating satisfactorily, the voting device 11 does not have sufficient information to determine which processor is actually operating properly. To take this state into account, the selecting circuit 12 comprises a means for isolating the output S of the computer when at least one failure is detected in the degraded mode.

Figure 2:
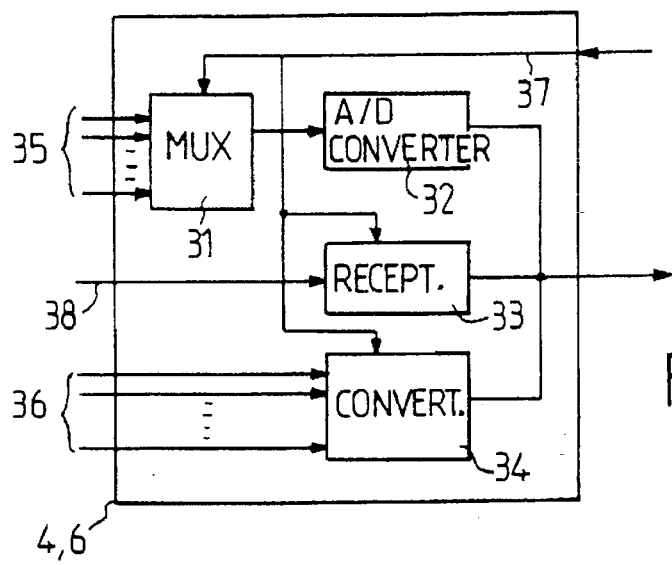
FIGS. 2 and 3 respectively show an acquisition circuit and a transmission circuit.

In FIG. 2, each acquisition circuit 4,6 comprises a multiplexer 31 to the inputs of which are applied analog signals 35. The analog signal selected by the multiplexer 31 is applied to the input of an analog-to-digital converter 32 before being transmitted to the processor 1 or 2.

This circuit 4,6 comprises inputs 36 to which logic signals are applied. These signals are processed by a converting circuit designed to gather them and convert them to digital data form before transmitting them to the processor 1 or 2.

It can also comprise a receiving circuit 33 for messages transmitted via a parallel or serial link 38, e.g. of the ARINC 429 type.

It further comprises a line 37 connected to the processor 1 or 2 and enabling the latter to select at all times the source of the data it wishes to receive.

Figure 3:
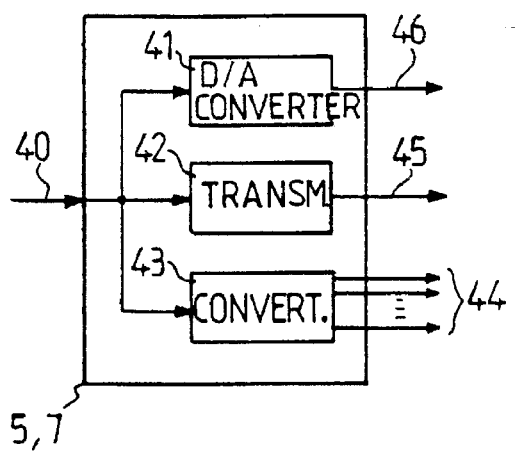

In FIG. 3, each transmission circuit 5,7 comprises the following in parallel to an input 40 connected to an output of the corresponding processor 1,2:

a digital-to-analog converter 41 supplying an analog signal on a line 46 from the digital data applied at input, a transmitter 42 of messages on a parallel or serial line 45, e.g. of the ARINC 429 type, and a converter 43 supplying logic signals at a set of outputs 44 from digital data applied at input.

The processor 1 or 2 associates with each datum it sends to the transmission circuit 5,7, a signal enabling the form in which the datum must be transmitted to be selected, i.e. which of the converters 41, 43 or the transmitter 42 should process the associated datum.

The outputs of the transmission circuit 5,7 are connected to certain corresponding inputs of the respective acquisition circuit 4,6 in order to enable the processor 1,2 of the chain C1,C2 to check the proper working order thereof.

Figure 4:
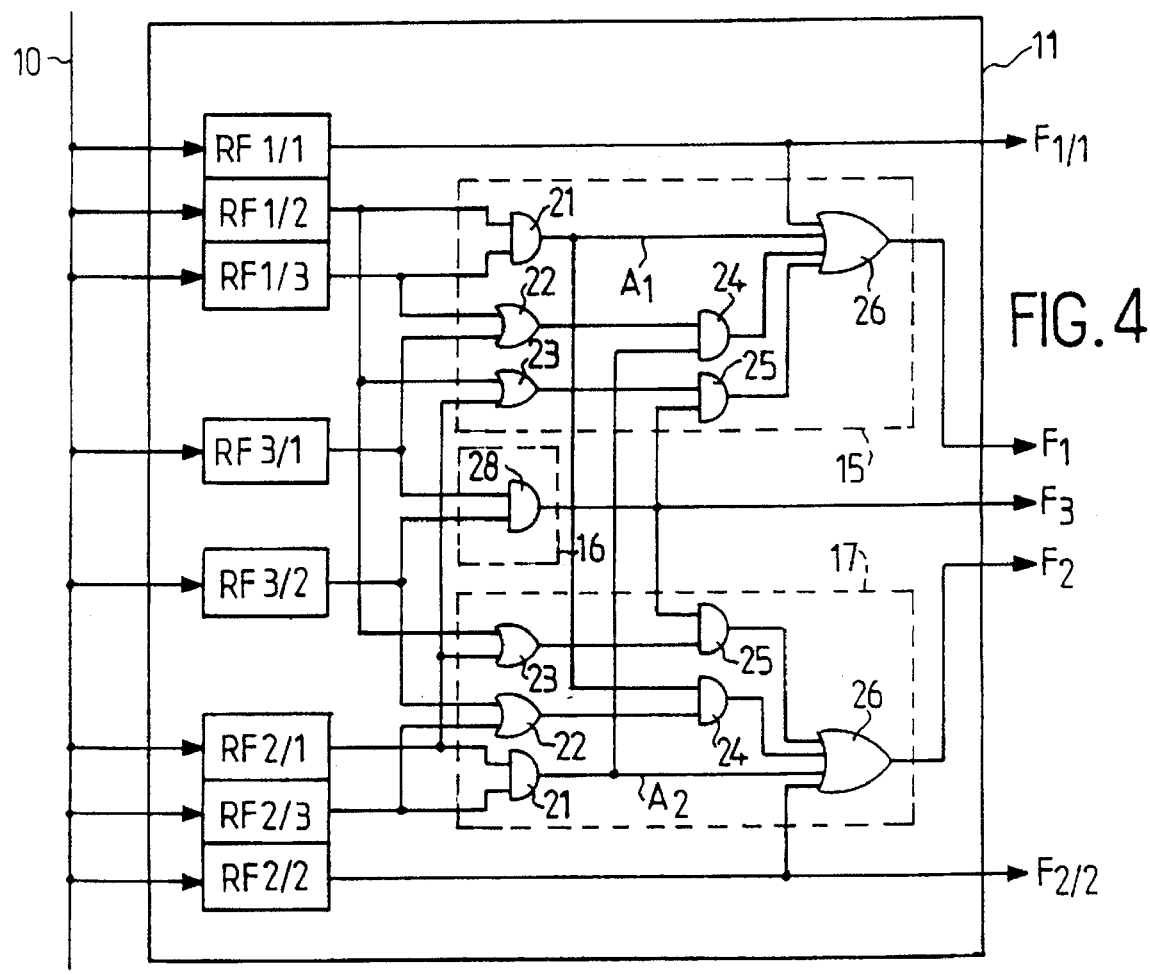
FIG. 4 shows the voting device in detail.

In FIG. 4, the voting device 11 comprises three logic circuits 15,16,17 intended to determine the operating status of the two processing chains C1,C2 and of the monitoring device 3 from the status thereof as determined by each of these.

To this end, this device comprises eight registers enabling the operating statuses determined by the two processing chains C1,C2 and the monitoring device 3 to be memorized, namely:

RF1/1 which memorizes the good or bad operating status of the first chain C1 determined by the processor 1 of the first chain C1, RF1/2 which memorizes the status of the first chain C1 as seen. by the processor 2 of the second chain C2, RF1/3 which memorizes the status of the first chain C1 as seen by the monitoring device 3, RF3/1 which memorizes the status of the monitoring device 3 as seen by the processor 1, RF3/2 which memorizes the status of the monitoring device 3 as seen by the processor 2, RF2/1 which memorizes the status of the second chain C2 as seen by the processor 1, RF2/2 which memorizes the status of the second chain determined by the processor 2, RF2/3 which memorizes the status of the second chain as seen by the monitoring device 3.

The respective contents of the registers RF1/1, RF1/2 and RF1/3 specifying the operating status of the first chain C1 as seen by the three processors 1,2,3 serve to determine, by vote, the actual operating status $F_1$ of this chain. To this end, they are applied to the inputs of the logic circuit 15 along with the actual operating status $F_3$ of the monitoring device 3. This logic circuit 15 comprises:

a first AND gate 21 to which are applied at input the contents of the registers RF1/2 and RF1/3, a first and a second OR gate 22,23 to which are respectively applied the contents of the registers RF1/3 and RF3/1, and the contents of the registers RF1/2 and RF2/1, a second and a third AND gate 24,25 of which one input is respectively connected to the outputs of the OR gates 22,23, and a third OR gate 26 supplying the signal $F_1$ and comprising four inputs respectively connected to the register RF1/1 and to the outputs of the three AND gates 21,24,25.

This logic circuit 15 supplies a signal $A_1$ from the first AND gate 21 to the logic circuit 17 serving to determine the status of the second chain C2, and receives from the latter a signal $A_2$ which is applied to the input of the second AND gate 24. Furthermore, the signal $F_3$ at output of the logic circuit 16, serving to determine the operating status of monitoring device 3, is applied to the input of third AND gate 25.

Thus, by way of the logic circuit 15, the chain C1 is declared out of order if:

its transmission and acquisition circuits are diagnosed as out of order by the processor 1 (RF1/1=1), or the processor 1 is diagnosed as out of order by the two other processors at the same time, or when the second chain C2 has already been declared out of order, the processor 1 is diagnosed as out of processor 3 is diagnosed as out of order by processor 1, or when the monitoring device 3 has already declared out of order, the processor 1 is diagnosed as out of order by the processor 2, or conversely, the processor 2 is diagnosed as out of order by the processor 1.

The last two cases correspond to the passivation of the remaining sequence as soon as one of the two processors remaining, subsequent to the first failure declared, declares the other processor out of order. Moreover, it can be remarked that if the chain C1 is declared out of order due to a failure in its acquisition or transmission circuit, it can continue to diagnose failures in the other chain C2 and in the monitoring device 3.

Conversely, if the registers RF1/1 and at least one of the registers RF1/2 and RF1/3 do not contain the value "1", and as the second chain C2 and the monitoring device 3 are in proper working order ($A_2$=0 and $F_3$=0), then the first chain C1 is declared in proper working order ($F_1$=0) by the voting device 11.

Similarly, the respective contents of the registers RF3/1 and RF3/2 specifying the operating status of the monitoring device 3 as seen by the processors 1,2 of the two chains C1,C2, serve to determine, by vote, the actual operating status $F_3$ of the monitoring device. To do so, they are applied to the input of an AND gate 28 of the logic circuit 16 issuing at output the actual status $F_3$ of the monitoring device 3 which is supplied at output of the voting device 11.

In this manner, if the monitoring device 3 is declared out of order by both the respective processors 1,2 of the two chains C1,C2, the latter being in proper working order, then the monitoring device 3 is declared out of order ($F_3$=1) by the voting device 11.

The actual operating status $F_2$ of the second chain C2 is worked out in the same way as that of the first chain C1, by means of a logic circuit 17 identical to the circuit 15, to the inputs of which are applied the signals $A_1$ and $F_3$ of the first chain C1 and of the monitoring device 3, and the output of the registers RF2/1, RF2/2 and RF2/3.

If one of the two chains C1,C2 or the monitoring device 3 is declared out of order, the computer then operates in a degraded mode in which the two chains C1,C2 or the monitoring device 3 still in proper working order monitor one another. The computer thus continues to have a redundant architecture.

Thus, for instance, if the second chain C2 is declared out of order by the first chain C1 and by the monitoring device 3 ($A_2$=1 and $F_2$=1), the content of the register RF1/3 need only move to "1", meaning that the monitoring device 3 has detected a failure in the first chain C1, for the logic circuit 15 to supply a signal $F_1$ in the logic "1" state.

On the other hand, if only the content of the register RF1/1 moves to "1", only the first chain C1 can be declared out of order ($F_1$=1). Thus, if the second chain C2 were in proper working order and the monitoring device 3 broken down, the computer could continue to operate with just the second chain C2, under the supervision. of the processor 1.

It should be noted that the voting device 11 has reversible operation, to the extent that one chain C1,C2 or the monitoring device 3 can be declared in proper working order ($F_i$=0) after having been declared out of order ($F_i$=1). This feature is particularly advantageous notably for the electronic equipment taken on board aerodynes and of which the operation can be temporarily disturbed e.g. by electromagnetic radiation.

Figure 5:
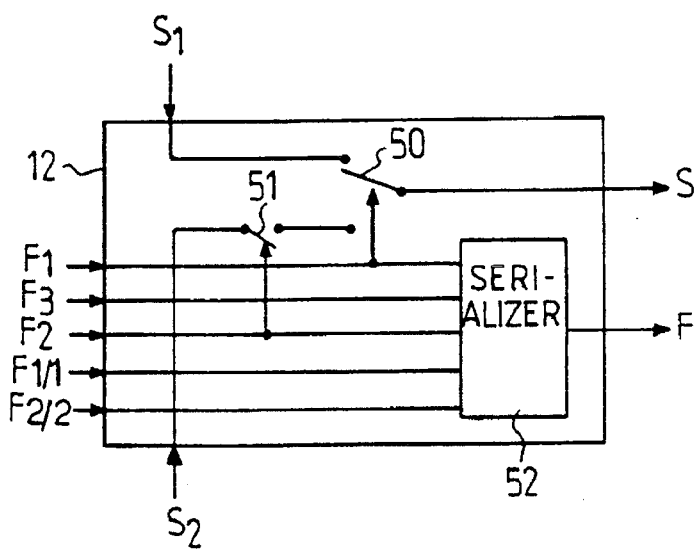
FIG. 5 schematically represents the selection device of said computer.

In FIG. 5, the selecting circuit 12 comprises a switch 50 enabling a selection to be made from among the outputs $S_1$ and $S_2$ of the two processing chains C1, C2, of the one sent to the output S of the computer. This switch 50 is controlled as a function of the good or bad operating status $F_1$ of the first chain C1 which is selected by default. When $F_1$ is equal to "1", the switch 50 flips to select and transmit the output $S_2$ of the second chain C2 to the output S of the computer.

This selecting circuit 12 further comprises a switch 51 connected both to the output $S_2$ of the second chain C2 and to the switch 50. It makes it possible not to apply the output $S_2$ to the output S of the computer if the second chain C2 is declared out of order ($F_2$=1).

According to an advantageous embodiment of the invention, this selecting circuit 12 comprises a serializer 52 intended to gather, in the form of a binary word, the respective statuses $F_1,F_2,F_3$ of the two processing chains C1,C2 and of the monitoring device 3, as well as the respective statuses $F_{1/1}$ and $F_{2/2}$ of the acquisition 4,6 and transmission 5,7 circuits.

By way of such an arrangement, the computer is thus capable of providing relatively accurate indications enabling the finding of any faults to be facilitated.

I claim:

1. A computer designed to perform at least one given function, to detect failures and to further perform said function subsequent to the detection of a failure, said computer comprising data inputs and data outputs, two redundant processing chains each performing said function, and a monitoring device comprising a processor monitoring operation of said two processing chains, each processing chains comprising an acquisition circuit connected to said data inputs of said computer, a transmission circuit providing output data to be applied to said data outputs of said computer and a processor performing said function from data provided by said acquisition circuit in order to provide data applied to said transmission circuit, and monitoring operation of said monitoring device and of one other of said processing chains, each of said processing chains and said monitoring device supplying status data relating to the operating status of each of said processing chains and said monitoring device, the computer further comprising a voting device connected to said two processing chains and to said monitoring device so as to receive said status data in order to determine whether one of said two processing chains or said monitoring device is out of order, and a selection device applying to said data outputs of said computer only the output data provided by one of the two processing chains determined to be operating properly by said voting device.

2. The computer as claimed in claim 1, wherein only the output data provided by the one of said two processing chains are applied by said selecting device to the data outputs of said computer even if both of said processing chains are determined to be working properly by said voting device.

3. The computer as claimed in claim 1, wherein the processor of each processing chain comprises a means for monitoring operation of acquisition and transmission circuits of said each processing chain, and a means for working out a status data relating to the operating status of these circuits, this status data being transmitted to said voting device.

4. The computer as claimed in claim 1, wherein said output data of said transmission circuit of each processing chain are further looped back as inputs of said acquisition circuit to enable the processor of said processing chain to check that said acquisition and transmission circuits are operating properly.

5. The computer as claimed in claim 1, wherein said voting device comprises a means to consolidate said status data provided by the processors of said two processing chains and said monitoring device, and to determine the respective actual operating statuses of said two processing chains and of said monitoring device.

6. The computer as claimed in claim 1, wherein said voting device comprises a means for declaring out of order the acquisition and transmission circuits of any one of said processing chains if detected out of order by the processor of said processing chain.

7. The computer as claimed in claim 1, wherein said voting device comprises a means for taking into account the operating statuses of the processors of any one of said processing chains and of said monitoring device, worked out by the processor of one other of said processing chains even if the acquisition and transmission circuits of said other of said processing chains were declared out of order beforehand.

8. The computer as claimed in claim 1, wherein said voting device comprises a means for declaring out of order any one of said processing chains detected out of order both by one other of said processing chains and by said monitoring device, and for declaring in proper working order any one of said processing chains detected in proper working order both by its own processor and by either one other of said processing chains or by said monitoring device.

9. The computer as claimed in claim 1, wherein said voting device comprises a means for declaring said monitoring device out of order if the processors of said two processing chains have detected said monitoring device out of order, and for declaring said monitoring device to be in proper working order if one or other of said processors has detected said monitoring device to be in proper working order.

10. The computer as claimed in claim 1, wherein said selecting circuit comprises a means for transmitting at output of said computer the actual operating statuses of said two processing chains and of said monitoring device, determined by said voting device, with a view to facilitating maintenance of said computer.

11. The computer as claimed in claim 1, wherein said selecting circuit comprises a means for transmitting at output of said computer the operating statuses of said two processing chains worked out respectively by the processors of said two processing chains, with a view to providing an indication relating to the operating status of the transmission and acquisition circuits of each processing chain.

* * * * *